(12) United States Patent
Cheng et al.

(10) Patent No.: US 6,616,104 B1
(45) Date of Patent: Sep. 9, 2003

(54) SPACECRAFT CONFIGURATION AND ATTITUDE STEERING METHOD FOR HIGHLY INCLINED ORBIT (HIO) COMMUNICATIONS

(75) Inventors: Gen-Sen James Cheng, Fort Washington, PA (US); Neil Evan Goodzeit, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/177,110

(22) Filed: Jun. 24, 2002

(51) Int. Cl.[7] ................................................. B64G 1/00
(52) U.S. Cl. .................. 244/158 R; 244/164; 455/427; 455/429; 455/12.1
(58) Field of Search .............................. 244/158 R, 164; 455/427, 429, 12.1

(56) References Cited

U.S. PATENT DOCUMENTS

| | | | |
|---|---|---|---|
| 6,389,336 B2 | * | 5/2002 | Cellier ........................ 701/13 |
| 6,442,385 B1 | * | 8/2002 | Marko ........................ 455/427 |
| 2002/0119750 A1 | * | 8/2002 | Youssefi .................... 455/12.1 |

* cited by examiner

*Primary Examiner*—J. Woodrow Eldred
(74) *Attorney, Agent, or Firm*—Townsend and Townsend and Crew LLP

(57) ABSTRACT

A method for controlling a geosynchronous spacecraft. A yaw axis and a roll axis of the spacecraft are oriented parallel to the earth equatorial plane. A coordinate frame of a payload is rotated about a minus roll axis of the spacecraft at an angle equivalent to an orbit inclination of the spacecraft, thereby maintaining elements of a payload pointing toward a desired region on the earth. A spacecraft attitude is corrected to maintain the payload elements pointing at the desired region on the earth.

45 Claims, 7 Drawing Sheets

SPACECRAFT CONFIGURATION AND ATTITUDE STEERING METHOD FOR HIGHLY INCLINED ORBIT (HIO) COMMUNICATIONS

FIELD OF THE INVENTION

The present invention relates to a configuration for a spacecraft and methods for operating and controlling a spacecraft, particularly a spacecraft arranged in a highly inclined orbit.

BACKGROUND OF THE INVENTION

Spacecraft often are placed in different orbits depending on their use. For example, intelligence gathering surveillance satellites typically have a low orbit altitude and are often launched into a circular near-polar orbit. This can increase their intelligence gathering utility by providing global coverage with twice daily passes over a particular geographic area. On the other hand, weather satellites may be placed into geosynchronous orbit to permit weather data to be continuously gathered in one location.

A new use of satellites is to broadcast audio as competition for terrestrial radio broadcasts. A common feature of Digital Audio Broadcast (DAB) systems is that they use a constellation of satellites in highly inclined orbits (HIO) to broadcast with high elevation angles to users in northern or southern latitudes. For example, the SIRIUS Satellite Radio system uses three satellites in 24 hour HIO orbits spaced 8 hours apart in repeating ground tracks. Each satellite operates in a window of ±4 hours about orbit apogee, denoted as the "apogee service arc". This system provides 100 channels of digital audio to mobile users in the United States with compatible DAB receivers. Another proposed system is Global Radio, which will use a constellation of three to six HIO satellites to provide DAB to mobile markets in Europe.

For DAB and other related applications, the advantage of the HIO orbit is that it can provide high elevation angles from the user to the satellite. Typical elevation angles range from about 70° above the horizon to directly overhead (i.e., an elevation angle of 90°), over regions of high latitude, for example, from about 30° to 60° latitude. In contrast, for similar latitudes the standard equatorial geosynchronous (GEO) orbit can at best provide elevation angles of only about 55° to about 36°.

The high elevation angles typically improve the quality of service by reducing signal blockages due to terrestrial obstructions. However, HIO systems have some drawbacks. One drawback of HIO systems is that costly modifications may be necessary to adapt a standard GEO spacecraft for operation in HIO. For example, the typical GEO spacecraft, an example of which is shown in FIG. 1, uses heat dissipating radiator panels that face in the north and south directions and flat-panel solar arrays that rotate about an axis, typically the pitch axis, that is roughly parallel to the earth pole axis. The efficiency of the radiators and the effectiveness of the solar arrays typically rely on the fact that the angle between the sun and the equatorial, or orbit, plane does not vary by more than about 23.5°. However, in a typical HIO orbit, which is inclined by about 40° to about 65°, the sun angles with respect to the orbit plane can vary up to nearly about 90° (65° plus 23.5°), rendering the standard GEO spacecraft configuration unusable.

SUMMARY OF THE INVENTION

The present invention provides a method for controlling a spacecraft. The method includes orienting the spacecraft in an orbit inclined about 40 degrees to about 65 degrees. A yaw axis and a roll axis of the spacecraft and north and south radiator panels of the spacecraft are oriented parallel to the earth equatorial plane. A solar array rotation axis is oriented parallel to the earth pole axis. A coordinate frame of a spacecraft payload is rotated about a minus roll axis of the spacecraft at an angle equivalent to an orbit inclination of the spacecraft, thereby maintaining elements of a payload pointing toward a desired region on the earth. A spacecraft attitude is corrected to maintain the payload elements pointing at the desired region on the earth.

Additionally, the present invention concerns a method for assembling a spacecraft. The method includes mounting thermal radiator panels such that in use they will be oriented parallel to an equatorial plane of the earth to face in a north-south direction. Flat panel solar arrays are mounted to rotate about a single axis that in use will be parallel to an earth pole axis. Payload antennas are mounted such that in use the antennas are rotated in a coordinate frame of the spacecraft at an angle substantially similar to an orbit inclination angle of the spacecraft.

Additionally, the present invention provides a spacecraft operable in an orbit inclined about 40 degrees to about 65 degrees. The spacecraft includes flat panel solar arrays that rotate about a single axis parallel to the earth pole axis. The spacecraft also includes thermal radiators facing in a north-south direction, such that the thermal radiator panels are parallel to the equatorial plane. Furthermore, the spacecraft includes payload antennas mounted to the spacecraft such that the payload antennas are rotated in a spacecraft coordinate frame, wherein the rotation angle of the payload antennas is substantially similar to an inclination of the orbit of the spacecraft.

Furthermore, the present invention provides a spacecraft constellation that includes about 3 to about 6 spacecraft operable to transmit digital audio broadcasts. The spacecraft are arranged in orbits inclined about 40 degrees to about 65 degrees. The spacecraft include flat panel solar arrays that rotate about a single axis parallel to the earth pole axis. The spacecraft also include thermal radiators facing in a north-south direction such that the thermal radiator panels are parallel to the equatorial plane. Additionally, the spacecraft include payload antennas mounted to the spacecraft such that the payload antennas rotate in a spacecraft coordinate frame, wherein the rotation angle of the payload antennas is substantially similar to an inclination of the orbit of the spacecraft.

Still other objects and advantages of the present invention will become readily apparent by those skilled in the art from a review of the following detailed description. The detailed description shows and describes preferred embodiments of the present invention, simply by way of illustration of the best mode contemplated of carrying out the invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood from the following specification when considered in conjunction with the accompanying drawings, in which.

DETAILED DESCRIPTION OF THE INVENTION

To remedy the above described problems, prior art HIO systems use a standard GEO spacecraft configuration, but with a sun-nadir attitude pointing strategy. For example, this is the strategy employed by SIRIUS Satellite Radio. For sun-nadir pointing, the spacecraft yaw axis and payload antennas remain directed towards the center of the Earth. The spacecraft continuously rotates about the yaw axis and orients the solar array to keep the solar arrays directed towards the sun.

With this approach, depending on the sun-orbit geometry, the spacecraft can undergo variations in yaw attitude of about 90° or more over the apogee service arc. To keep the payload beams pointed at fixed earth coverage regions requires that the beams be continuously steered (rotated) in the spacecraft body frame to compensate for the changes in the spacecraft yaw attitude. Beam steering may require the use of complex payload equipment such as a digital beam former, with an associated large weight, cost, and mass penalty. For example, such beam formers may cost about 20 to 40 million dollars to develop, have a recurring cost of about 5 to 10 million per spacecraft, weigh up to about 70 kg, and require about 2000 Watts of power to operate.

The present invention provides a low-cost method for adapting a GEO spacecraft for application to HIO missions, such as DAB. The invention can be embodied using a standard GEO spacecraft with a common north/south thermal radiator configuration and flat panel solar arrays that rotate about a single axis. In accordance with an exemplary embodiment of the present invention, the payload antennas are mounted to the spacecraft so they are rotated in the spacecraft coordinate frame. This can be accomplished by mounting the payload antenna to the spacecraft, or for example, controlling their movement in accordance with the spacecraft coordinate system. The rotation angle of the payload antennas is roughly equal to the orbit inclination so that the antennas are directed towards the northern (or southern) latitude coverage area when the spacecraft is in the vicinity of orbit apogee. With the above exemplary configuration, the spacecraft body remains oriented with its north and south radiator panels substantially parallel to the equatorial plane and the solar array axis substantially parallel to the earth pole axis. With this arrangement, in the region about orbit apogee where the payload operates, the GEO spacecraft sun constraint of ±23.5 degrees is approximately satisfied. Additionally, the method eliminates the need for active beam steering, thereby reducing the payload cost and complexity. With only small attitude offset corrections to the nominal spacecraft orientation, the beams remain pointed at their earth targets.

Figure 1:
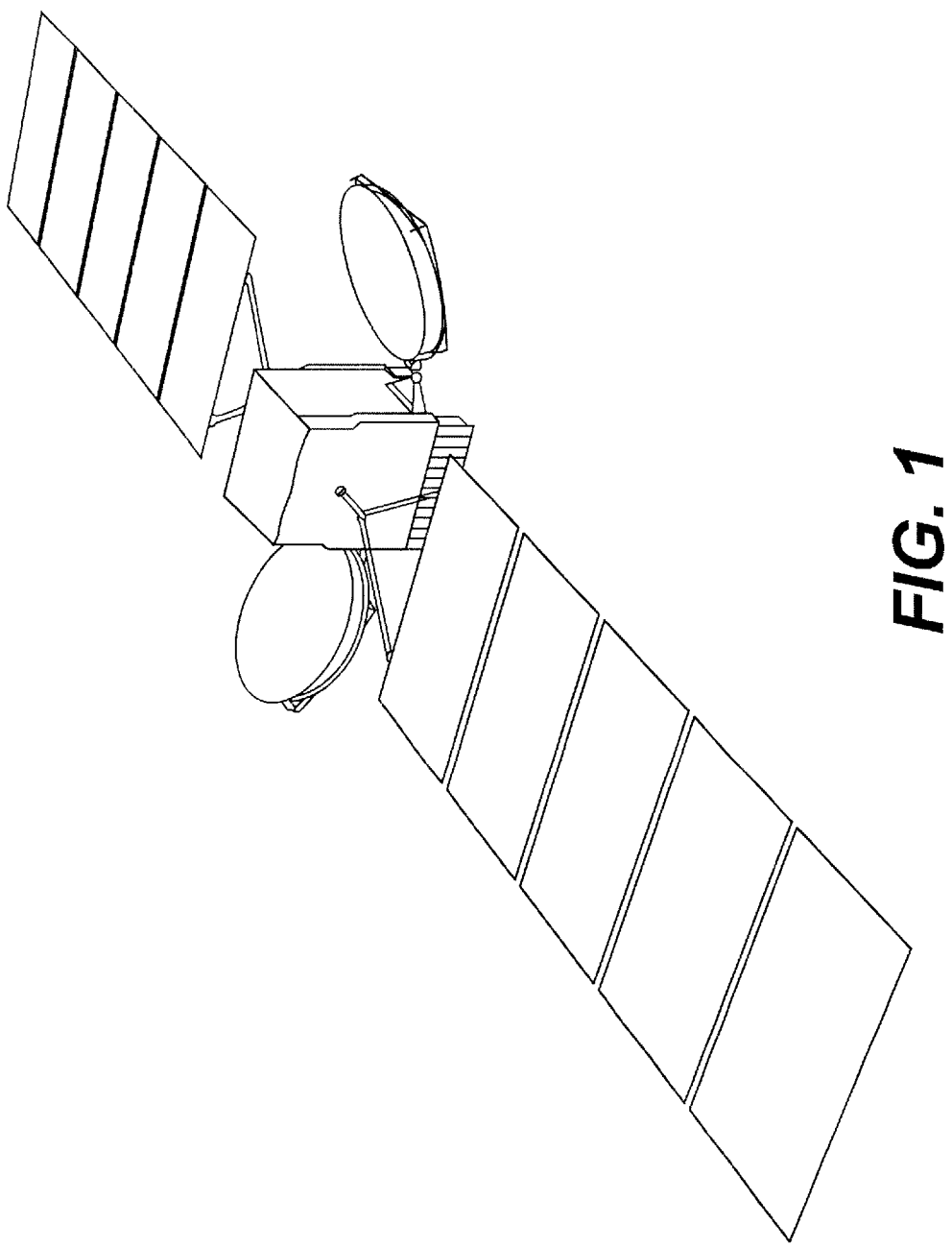
FIG. 1 represents a known geosynchronous spacecraft design.
Figure 2:
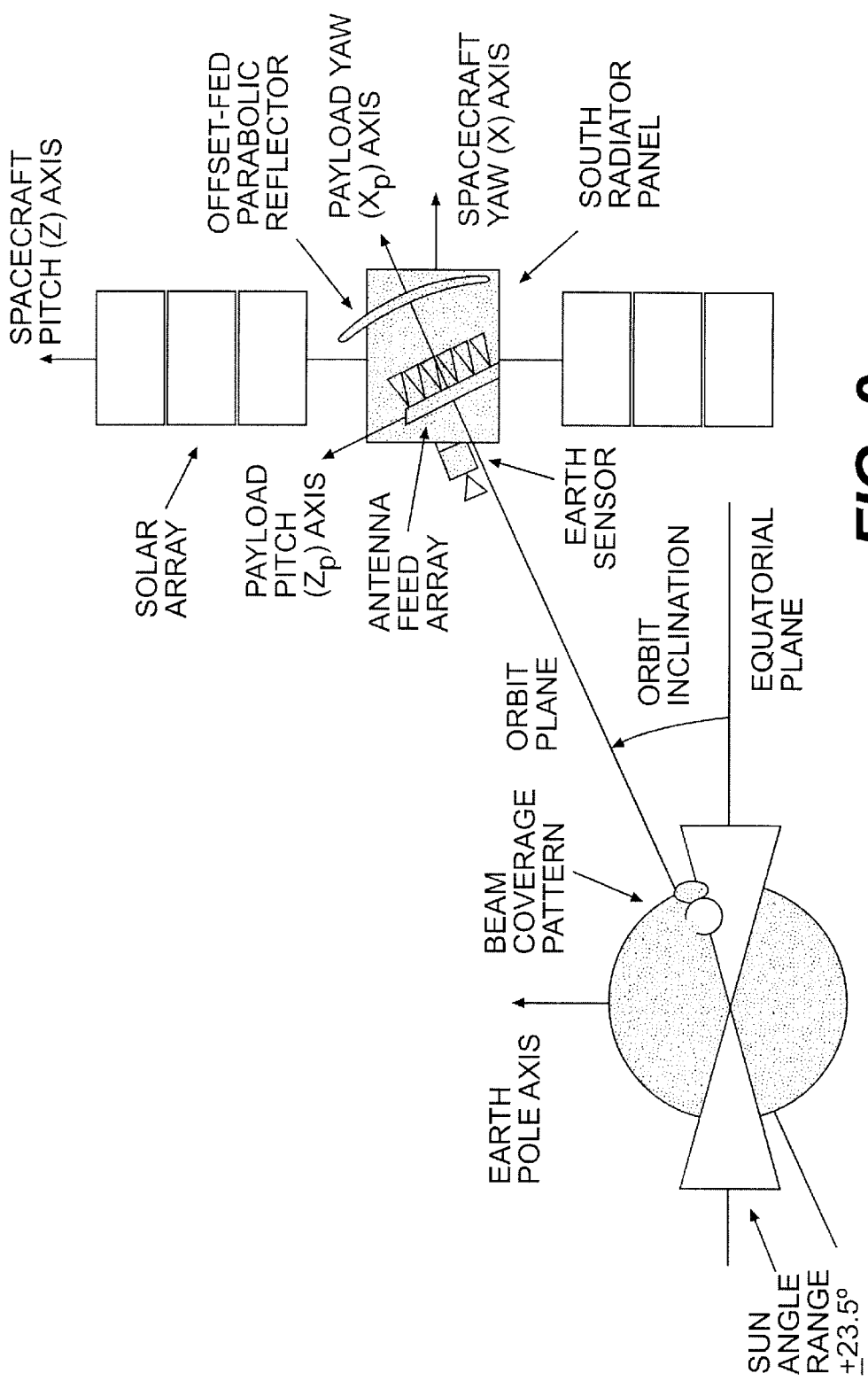
FIG. 2 represents a spacecraft in an embodiment of orbital attitude according to the present invention.

FIG. 2 shows a HIO spacecraft in an embodiment of orbital attitude according to the invention. The spacecraft is shown at orbit apogee with a coverage region in the Northern Hemisphere. The satellite broadcasts information to an earth coverage region with a service arc including several hours before and after orbit apogee. When the satellite passes out of this orbit region, service is provided by the next satellite in the constellation that is entering, or is operable in the vicinity of, the service arc. The orientation of the spacecraft body frame is defined with respect to the yaw (x), roll (y), and pitch (z) axes, nominally oriented as shown. The pitch axis, which is also the solar array rotation axis, is parallel or substantially parallel to the earth pole axis. The spacecraft yaw and roll axes are parallel or substantially parallel to the earth equatorial plane.

With the spacecraft body in this orientation, the north and south radiator panels are also parallel or substantially parallel to the equatorial plane. Therefore, at orbit apogee, the angle between the spacecraft yaw/roll plane and the sun vector will be within approximately ±23.5 degrees. This sun angle range is the normal design range for GEO spacecraft. Hence, the spacecraft thermal design is not materially affected by operation in the HIO orbit. In addition, the angle between the solar array normal and the sun will also remain within the same range, and hence the solar array will be effective at generating the power required to operate the bus and communications payload. Furthermore, the solar array sizing typically is not materially affected by operation in the HIO orbit.

FIG. 2 also illustrates a payload coordinate frame denoted by $x_p$, $y_p$, and $z_p$. The payload coordinate frame is a spacecraft-fixed frame that is rotated about the spacecraft minus roll (−y) body axis by an angle that is, for example, substantially equal to the orbit inclination. As will be described in detail below, to perform a communications mission, the spacecraft-fixed payload coordinate frame is aligned with a target payload frame. At orbit apogee the target payload frame is coincident, or approximately coincident, with an orbit frame $x_0$, $y_0$, $z_0$, where $x_0$ is a vector directed, or approximately directed, from the center of the earth to the spacecraft, $z_0$ is aligned, or approximately aligned, with the orbit normal, and $y_0$ forms a right-hand triad with $x_0$ and $z_0$. Therefore, at orbit apogee, with the spacecraft payload frame substantially aligned with the target payload frame, the payload roll axis is substantially parallel to the equatorial plane. The payload antenna and earth sensor boresights are substantially aligned with the minus $x_p$ axis and, hence, will be directed towards the earth coverage region. This arrangement eliminates the need to actively steer beams either electrically or mechanically to maintain fixed earth coverage geometry. However, as the spacecraft moves though the service arc, small attitude corrections may be needed relative to a nominal target payload frame to maintain the correct beam pointing. Note that, although attitude corrections minimize the variations in the beam pointing, unavoidable changes in beam size may still occur due to changes in the spacecraft altitude over the orbital service arc. Also as pointed out below, a spacecraft may be configured and operated in accordance with the present invention, with small attitude corrections relative to the nominal payload target frame implemented by beam steering rather than attitude steering. With this approach, the major benefits of the present invention would be realized from a spacecraft configuration standpoint, and the beam steering requirements would be small and easily implemented using, for example, a simple mechanical steering approach.

After assembling the spacecraft such that it has the above-described configuration of solar panels, thermal radiators, and payload antennas and after placing the spacecraft in orbit, the attitude of the spacecraft will be controlled to ensure proper payload pointing. The required attitude corrections relative to a nominal target payload frame can be calculated as follows. Note that the definition of the nominal target payload frame is somewhat arbitrary, and hence the method can be readily adapted to other definitions. However, the transformation from the orbit frame to the corrected target payload frame following applications of the attitude corrections will be same regardless of the nominal target payload frame definition or the method used to compute the attitude corrections.

In the described example of the method, at each position in the service arc, the transformation from the earth fixed coordinate frame to a nominal target payload frame $T_{te}$ is given by Equation 1

$$T_{te} = T_{yaw} T_{oi} T_{ie} \quad (1)$$

where $T_{te}$ is the earth fixed to inertial frame transformation and $T_{oi}$ is the inertial to orbit frame transformation, and $T_{yaw}$ is the orbit frame to nominal target payload frame transformation ($x_t$, $y_t$, $z_t$). The orbit frame is defined as described above. The transformation $T_{yaw}$ is desirably defined such that, for example, the earth pole axis is oriented in the nominal target payload frame yaw/pitch ($x_t/z_t$) plane. In such orientation it is desirable that the earth pole axis is oriented entirely in the nominal target payload frame yaw/pitch ($x_t/z_t$) plane. Hence, the target payload frame $y_t$ axis is parallel to the equatorial plane.

The rotation represented by $T_{yaw}$ (the yaw rotation from the orbit frame to the nominal target payload frame) is desirably zero or substantially zero at orbit apogee. This means that at this orbital position the orbit and nominal target payload frames are substantially aligned. At the orbit ascending node, the yaw rotation is equal, or substantially equal, to minus the orbit inclination. At the descending node the yaw rotation is equal, or substantially equal, to the orbit inclination.

At orbit apogee, the matrix of beam center vectors in the nominal target payload frame is given by Equation 2

$$V_t(apogee) = [V_1, V_2, \ldots V_N] \quad (2)$$

where each 3×1 vector $V_i$, i=1, N is a unit vector from the spacecraft to the center of the $i^{th}$ beam on the earth's surface If the spacecraft payload frame is aligned with a nominal target frame according to Equation (1), then except precisely at orbit apogee, there will be an error in the beam center pointing given by Equation 3

$$V_{error} = V_t(apogee) - T_c V_t \quad (3)$$

where $V_t = T_{te} V_e$, with $V_e$ a matrix of unit vectors in the earth-fixed frame from the spacecraft to the N beam centers on the surface of the earth, and $T_c$ is an attitude correction matrix that is selected to minimize the pointing error. The optimal attitude correction at each position along the service arc is the one that minimizes the sum of the squared elements of $V_{error}$. Assuming a small rotation from the nominal target payload frame to a corrected target payload frame, $T_c$ may be expressed as Equation 4

$$T_c = \begin{bmatrix} 1 & \theta_z & -\theta_y \\ -\theta_z & 1 & \theta_x \\ \theta_y & -\theta_x & 1 \end{bmatrix} = I_{3\times3} + \Delta_c \quad (4)$$

where $\theta_x$, $\theta_y$, and $\theta_z$, are the yaw, roll, and pitch attitude corrections, $I_{3\times3}$ is an identity matrix, and $\Delta_c$ is a 3×3 skew-symmetric matrix of the attitude corrections.

Assuming a correction exists that results in zero error, i.e., $V_{error} = 0$. Equation 3 becomes $$V_t(apogee) = T_c V_t = (I_{3\times3} + \Delta_c) V_t \quad (5)$$

From Equation 5, the equation for the first beam center vector $V_1$ can be manipulated to obtain $$V_1(apogee) - V_1 = \Delta_c V_1 = \overline{V}_1 \Theta = \begin{bmatrix} 0 & -V_{1z} & V_{1y} \\ V_{1z} & 0 & -V_{1x} \\ -V_{1y} & V_{1x} & 0 \end{bmatrix} \begin{bmatrix} \theta_x \\ \theta_y \\ \theta_z \end{bmatrix} \quad (6)$$

Similar equations can be written for the other beam center vectors $V_i$, i=2, N, and these equations can be combined to obtain a single matrix equation involving the vector of attitude corrections as represented by Equation 7

$$\overline{V}_{error} = \overline{V}\Theta \quad (7)$$

where $$\overline{V}_{error} = \begin{bmatrix} V_1(apogee) \\ V_2(apogee) \\ \vdots \\ V_N(apogee) \end{bmatrix} - \begin{bmatrix} V_1 \\ V_2 \\ \vdots \\ V_N \end{bmatrix} \quad \overline{V} = \begin{bmatrix} \overline{V}_1 \\ \overline{V}_2 \\ \vdots \\ \overline{V}_N \end{bmatrix} \quad (8)$$

The least-squares solution for the attitude corrections is then given by $$\Theta = (\overline{V}^T \overline{V})^{-1} \overline{V}^T \overline{V}_{error} \quad (9)$$

The described calculations can be performed on various platforms, including for example, a spacecraft or the ground. The calculations do not need to be performed as a spacecraft is in a service arc, but can be uploaded to a spacecraft for use during its service period.

Figure 3:
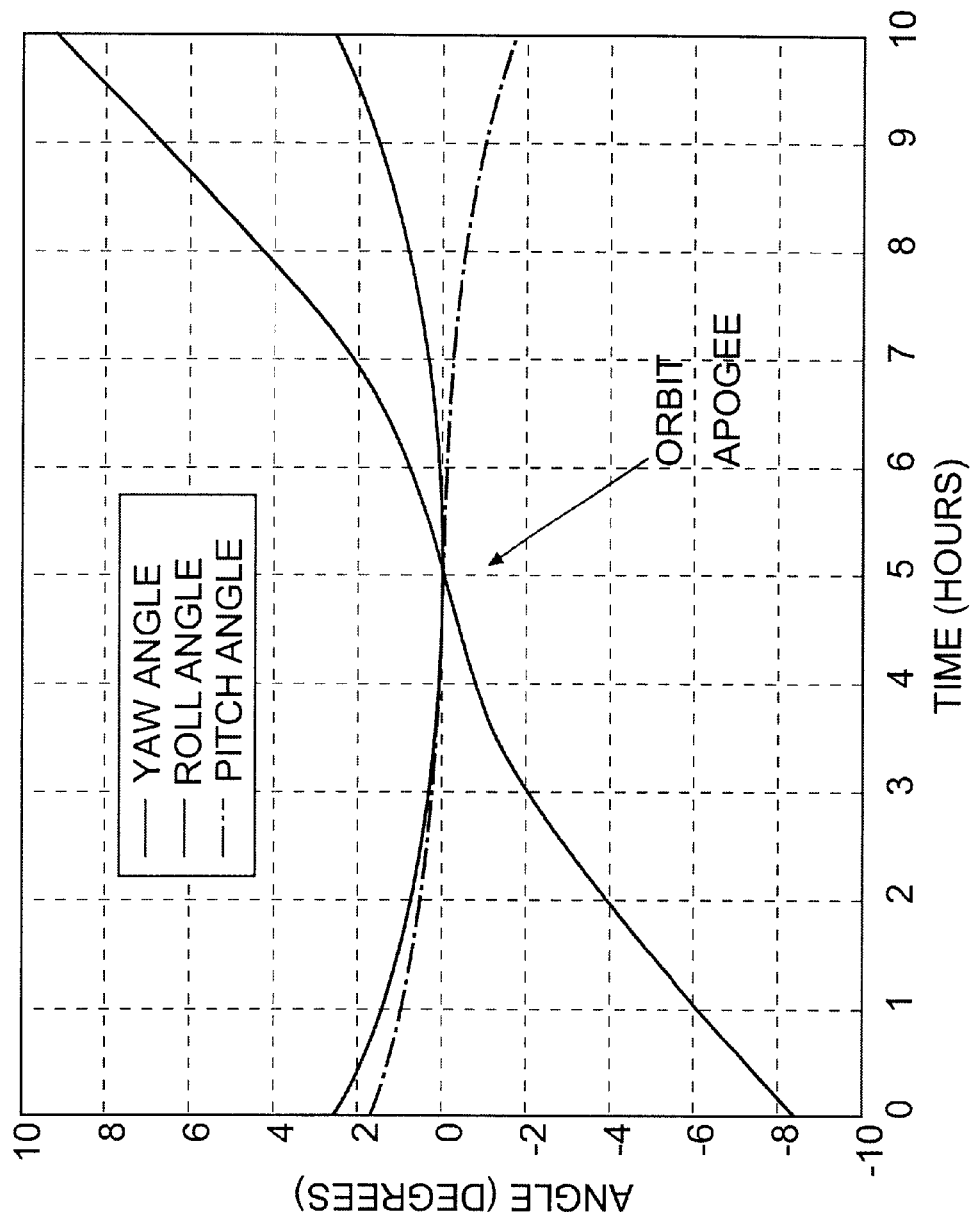
FIG. 3 represents a graph that illustrates relationships between yaw, roll, and pitch angle and time with respect to a nominal target payload pointing frame for a spacecraft according to the present invention.

FIG. 3 represents a graph that illustrates typical yaw, roll, and pitch attitude corrections with respect to a nominal target payload frame according to an embodiment of the present invention. The exemplary attitude corrections are for a HIO spacecraft in a 24 hour orbit with an inclination of about 55 degrees, an eccentricity of about 0.32, an ascending node longitude of about 43 degrees East, and an argument of perigee of 270 degrees. Each of three spacecraft in the constellation operates over a European coverage service arc of ±5 hours about apogee.

Note that the attitude corrections computed as described above are approximate, with an accuracy that depends on the validity of the small angle assumption implicit in Equation 4. As will be obvious to those of skill in the art, it is possible to improve the accuracy of the method by performing the steps iteratively. In such an iterative scheme, the attitude corrections are computed using the above steps and then used to update the transformation from the orbit to the nominal target payload frame as $$T_{yaw} = M T_{yaw} \tag{10}$$

Where the 3×3 matrix M is computed from the attitude corrections $$M = \begin{bmatrix} \cos\theta_z\cos\theta_y & \cos\theta_z\sin\theta_y\sin\theta_x + \sin\theta_z\cos\theta_x & -\cos\theta_z\sin\theta_y\cos\theta_x + \sin\theta_z\sin\theta_x \\ -\sin\theta_z\cos\theta_y & -\sin\theta_z\sin\theta_y\sin\theta_x + \cos\theta_z\cos\theta_x & \sin\theta_z\sin\theta_y\cos\theta_x + \cos\theta_z\sin\theta_x \\ \sin\theta_y & -\cos\theta_y\sin\theta_x & \cos\theta_y\cos\theta_x \end{bmatrix} \tag{11}$$

As is readily seen, when the angles are small. M reduces to the matrix $T_c$ given in Equation 4. Following the update, $T_{yaw}$ becomes the transformation from the orbit to the corrected target payload frame. The steps are then repeated using the corrected target payload frame transformation, until the solved-for attitude corrections become small. By orienting the spacecraft payload frame to track the corrected target payload frame over the service arc, the errors in the beam center pointing will be minimized.

For the spacecraft producing the results shown in FIG. 3, the coverage region is defined by a pan-European beam and six regional beams. Table 1 provides the longitude and latitude of each beam center.

TABLE 1

HIO Mission Beam Center Locations

| Beam | North Latitude (deg) | East Longitude (deg) |
|---|---|---|
| Pan-European | 48.4 | 7.5 |
| England | 52.7 | −3.8 |
| Spain | 39.7 | −3.8 |
| France | 46.6 | 2.5 |
| Germany | 49.8 | 9.8 |
| Italy | 43.6 | 11.9 |
| Eastern Europe | 48.0 | 17.3 |

Figure 4A:
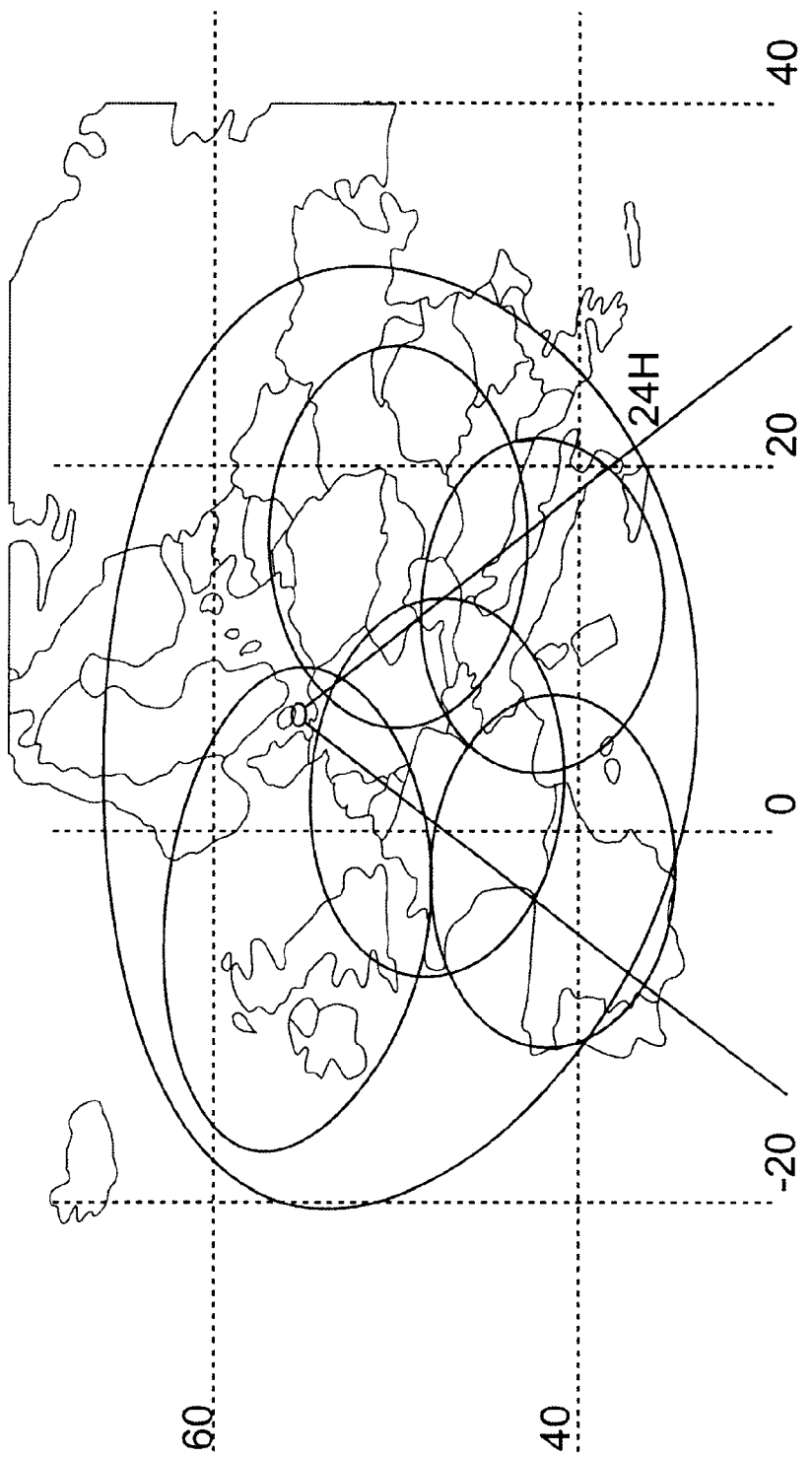
FIG. 4a represents a map that illustrates a beam pattern for a pan-European beam and six regional European beams five hours before orbit apogee.
Figure 4B:
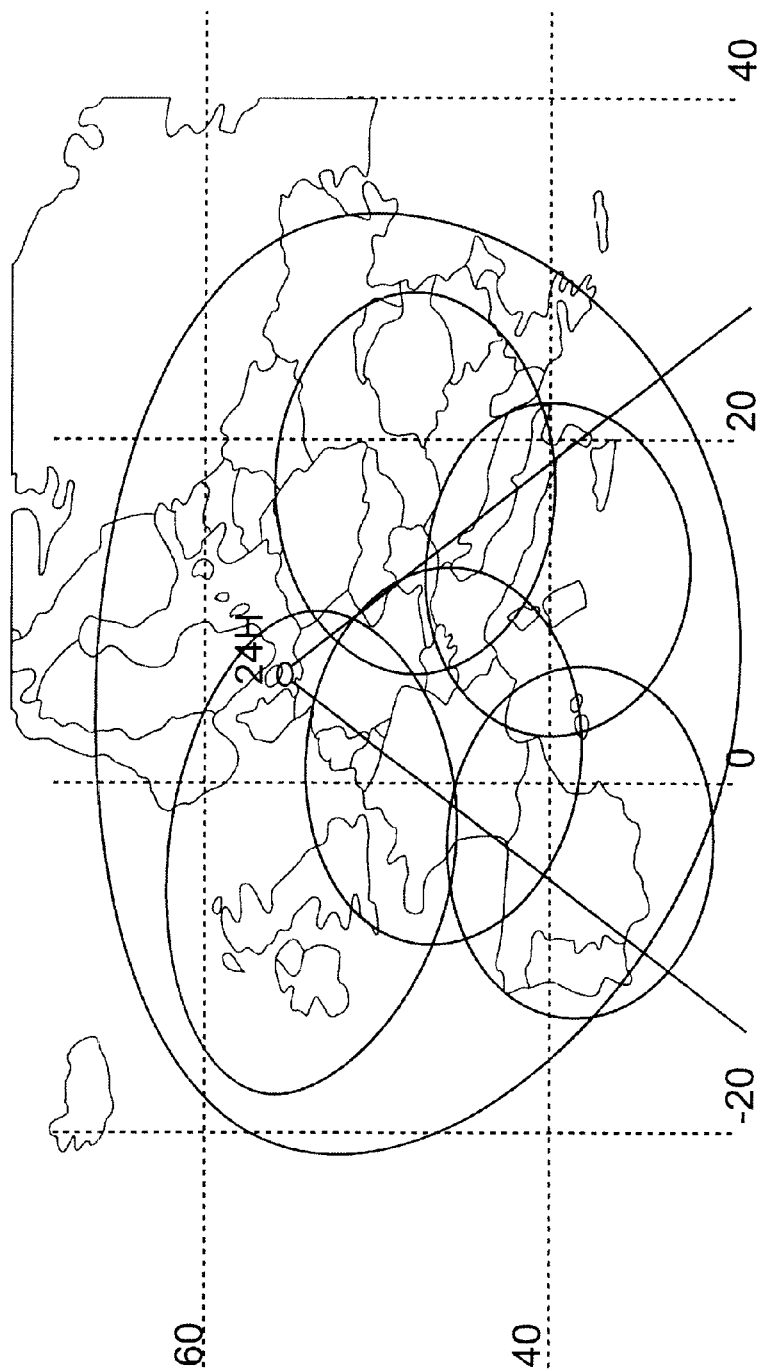
FIG. 4b represents a map that illustrates a beam pattern for a pan-European beam and six regional European beams at orbit apogee.
Figure 4C:
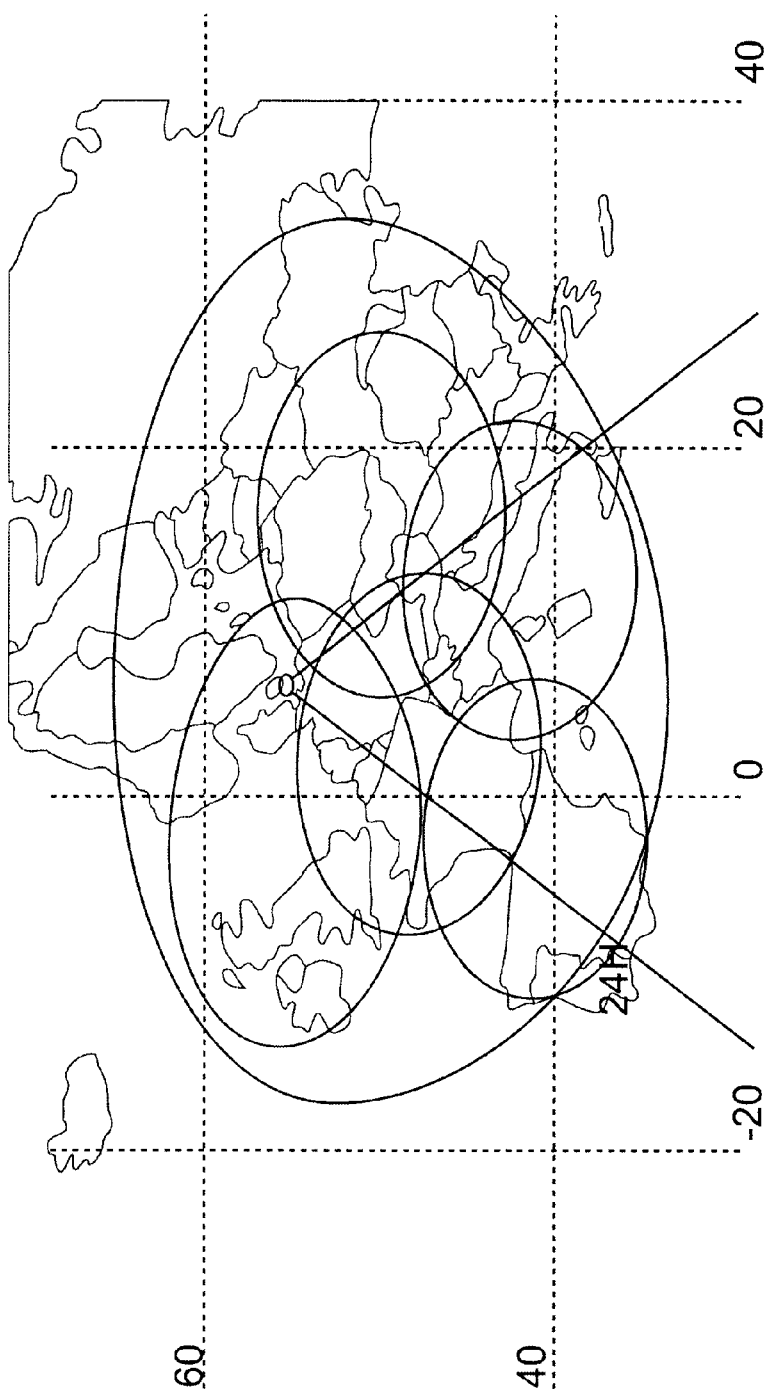
FIG. 4c represents a map that illustrates a beam pattern for a pan-European beam and six regional European beams five hours after orbit apogee.

FIGS. 4a–4c represent a map of a portion of the earth illustrating the beam pattern on the earth surface for a spacecraft in the service arc for a spacecraft in the example. Along these lines, FIG. 4a illustrates the beam pattern with the spacecraft about 5 hours prior to apogee. Additionally, FIG. 4b depicts the beam pattern with the spacecraft approximately at apogee. Furthermore, FIG. 4c shows the beam pattern about 5 hours after apogee.

The spacecraft attitude is controlled to a nominal target payload frame that may be defined by Equation 1 and with offsets from this frame that may be computed using Equation 9. The figures show that the beams remain relatively fixed with little rotation or translation. The main effect is a change in the diameter of the beams as the spacecraft altitude changes, such change is usually unavoidable.

As described previously, the spacecraft and pointing geometry according to the invention results in sun angles with respect to the spacecraft yaw/roll (x/y) plane at orbit apogee that remain within approximately ±23.5 degrees. However, depending on the orbit right ascension and the time of year, the sun angles will in general increase for other orbit positions, with the largest angles occurring at the extremes of the service arc. The sun vector in the spacecraft body frame may be calculated from Equation 12

$$S_b T_{bp} T_c T_{yaw} T_{oi} S_i \tag{12}$$

where $S_b$ is the sun vector in the body frame, $S_i$ is the sun vector in the inertial frame, and $T_{bp}$ is the transformation from the spacecraft payload frame to the spacecraft body frame given by Equation 13

$$T_{bp} = \begin{bmatrix} \cos(\phi) & 0 & -\sin(\phi) \\ 0 & 1 & 0 \\ \sin(\phi) & 0 & \cos(\phi) \end{bmatrix} \tag{13}$$

where φ is equal to the orbit inclination. The angle between the Sun and the spacecraft yaw/roll plane is defined by Equation 14

$$\theta_{sun} = \sin^{-1}(S_{bz}) \tag{14}$$

Figure 5:
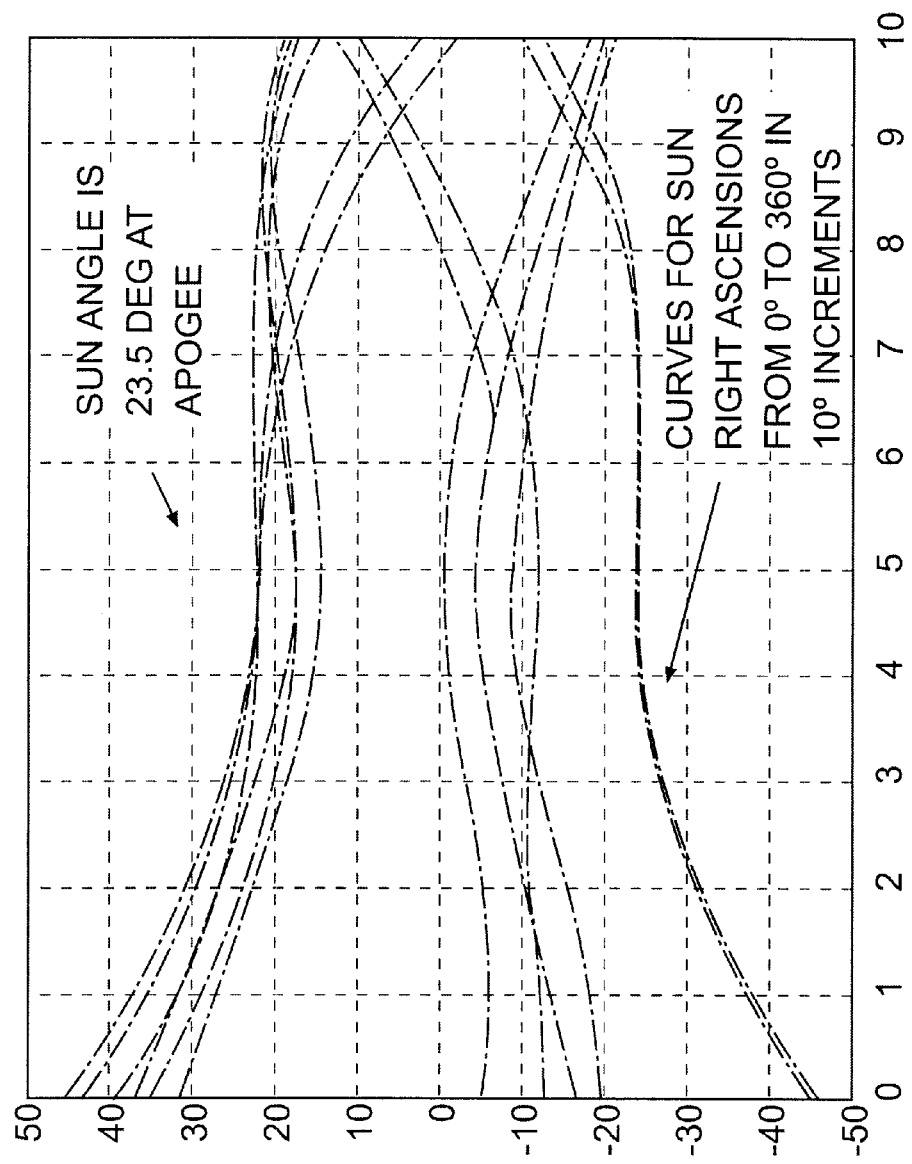
FIG. 5 represents a graph that illustrates relationships between sun angles and a service arc for an embodiment of a spacecraft according to the present invention.

To illustrate how the sun angles can vary over the service arc, FIG. 5 shows the sun angles for the example HIO mission over 1 year for an orbit right ascension of about 70°. This right ascension (as well as 290°=360−70) result in the largest sun angles for this mission.

As can be seen, the maximum sun angle about 5 hours before apogee is approximately 45°. It should be noted that for this example, the worst-case scenario corresponds to a sun right ascension of about 100°. The maximum sun angle decreases rapidly as the spacecraft approaches apogee. Since the payload does not become fully operational until about 4 hours prior to apogee, where the maximum sun angle is about 38°, the increased sun angles can be easily accommodated with only minor impacts to the power system. From a thermal perspective, because of the long thermal time constants involved, for example, on the order of about 3 to 4 hours, the impact of the elevated sun angles is small. Over the first hour of full payload operation in the interval of about 3 to 4 hours from apogee, the maximum three-hour average sun angle is about 30°. The approximate 7° difference between this and the normal design maximum of about 23.5° can be easily accommodated with only minor impacts to the thermal radiator sizing.

In addition to the above, an anticipated use of the present invention is to configure and operate a spacecraft in the manner described, but with the small attitude corrections relative to the nominal payload target frame implemented by beam steering rather than attitude steering. Hence, with this approach the major benefits of the present invention are still be realized from a spacecraft configuration standpoint, the beam steering requirements would be minor and easily implemented using, for example, a mechanical steering approach.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for configuring and operating a spacecraft in an orbit that is inclined with respect to the earth's equatorial plane, wherein the spacecraft includes at least a solar array and radiator panels, and operates for at least a portion of the orbit designated as a service arc, the method comprising:

nominally orienting a yaw axis and a roll axis of the spacecraft such that the radiator panels are substantially parallel to the earth equatorial plane and a rotation axis of the solar array is substantially parallel to the earth pole axis;

configuring the spacecraft with a coordinate frame of a payload rotated and fixed about the roll axis of the spacecraft at an angle equivalent to about an orbit inclination of the spacecraft so as to maintain a desired degree of a payload pointing toward a desired region on the earth's surface; and correcting a spacecraft attitude over at least a portion of the service arc with respect to the nominal orientation to maintain at least a portion of the desired degree of payload pointing toward the desired region on the earth's surface.

2. The method according to claim 1, wherein the payload element comprises at least one payload antenna.

3. The method according to claim 1, wherein the orbit comprises approximately a 24 hour period orbit with an inclination in the range of approximately 53 to 57 degrees, an eccentricity of approximately 0.32, an argument of perigee of approximately 270 degrees, and an ascending node longitude of approximately 43 degrees East.

4. The method according to claim 1, wherein the service arc is in the range of approximately plus and minus 5 hour period about the orbit apogee.

5. The method to claim 1 wherein the payload element implements a digital audio system for Europe that includes a pan-European beam and a multiciplicity of regional European spot beams.

6. The method according to claim 1, wherein orienting and correcting the spacecraft attitude comprises:

orientating the spacecraft to substantially align the payload element with a nominal target payload frame; and applying corrective attitude offsets from the nominal target payload frame to maintain the payload elements substantially pointing at the desired geographic region.

7. The method according to claim 1, wherein orienting the spacecraft comprises:

orienting the spacecraft such that the sun angles with respect to the spacecraft yaw-roll plane remain approximately within the range of about plus and minus 23.5 degrees at orbit apogee.

8. The method according to claim 1, wherein correcting the spacecraft attitude comprises:

calculating first beam center unit vectors based on a data for a spacecraft position in the vicinity of an orbit apogee in a nominal target payload reference frame, wherein each first beam center vector represents at least an approximation of a line-of-sight from the spacecraft to the center of a beam on the earth's surface;

calculating second beam center unit vectors in a nominal target payload frame based on data for a spacecraft position in the vicinity of the service arc;

calculating a matrix of beam center pointing errors based on a combination of the first and second beam center vectors;

calculating a composite matrix that includes skew-symmetric matrices of beam center unit vectors at a given position within the service arc;

calculating a vector of attitude corrections based on the matrix of beam center pointing errors and the composite matrix of beam center vector skew-symmetric matrices; and correcting the spacecraft attitude over at least a portion of the service arc by substantially aligning the spacecraft payload frame with a corrected target frame determined based on using the computed attitude corrections.

9. The method according to claim 8, wherein the combination includes the difference between the first and second beam center vectors.

10. The method according to claim 1, further comprising; rotating the solar array about the rotation axis.

11. The method according to claim 1, wherein the spacecraft includes a payload that comprises at least one antenna operable to direct digital audio broadcasts toward a target region on the earth, the method further comprising:

directing digital audio broadcasts toward a target region on the earth.

12. A method for configuring and operating a spacecraft in an inclined orbit, wherein the spacecraft comprises at least a solar array and one or more radiator panels, and operates for at least a portion of the orbit designated as a service arc, the method comprising:

nominally orienting the spacecraft so that at about orbit apogee, a yaw axis and a roll axis of the spacecraft is oriented such that the one or more radiator panels are substantially parallel to the earth equatorial plane, and a rotation axis of the solar array is oriented substantially parallel to the earth pole axis,;

configuring the spacecraft with a payload rotated and fixed about an axis of the spacecraft at an angle equivalent to about an orbit inclination of the spacecraft, so as to maintain a desired degree of a payload pointing toward a desired region on the earth's surface; and correcting a spacecraft attitude over at least a portion of the service arc with respect to the nominal orientation to maintain at least a portion of the desired degree of payload pointing toward the desired region on the earth's surface.

13. A spacecraft operable in an inclined orbit with respect to the earth's equator, the spacecraft operable for at least a portion of the orbit designated as a service arc, the spacecraft comprising:

at least one solar array rotatable about a single axis;

at least one thermal radiator;

at least one payload antenna rotated and fixed about a spacecraft coordinate frame, wherein the rotation angle of the payload antennas is substantially similar to an inclination of the orbit of the spacecraft so as to maintain a desired degree of a payload antenna pointing toward a desired region on the earth's surface; and attitude adjusters adapted to adjust the attitude of the spacecraft;

wherein the spacecraft is configured such that at orbit apogee the spacecraft has a nominal orientation in which the at least one solar array is substantially parallel to the earth pole axis, and the at least one thermal radiator is facing in a north-south direction; and wherein the attitude adjusters are adapted to correct the spacecraft attitude over at least a portion of the service arc with respect to the nominal orientation to maintain at least a portion of the desired degree of payload antenna pointing toward the desired region on the earth's surface.

14. The method according to claim 2, wherein the payload element further comprises an earth sensor boresight.

15. The method according to claim 1, wherein the orbit inclination is between about 40 degrees and about 65 degrees.

16. The method according to claim 1, wherein the spacecraft is oriented at the nominal orientation at about orbit apogee.

17. The method according to claim 16, wherein the payload is rotated and fixed about a minus roll axis of the spacecraft, and wherein the step of correcting a spacecraft attitude comprises correcting the spacecraft attitude so that the spacecraft yaw rotation is approximately equal to minus the orbit inclination angle at the orbit ascending node and the spacecraft yaw rotation is approximately equal to the orbit inclination angle at the orbit descending node.

18. The method according to claim 12, further comprising orienting the payload antenna so as to be directed towards one of a northern and a southern latitude coverage area when the spacecraft is in the vicinity of an orbit apogee.

19. The method according to claim 12, wherein the payload element comprises at least one payload antenna.

20. The method according to claim 19, wherein the payload element further comprises an earth sensor boresight.

21. The method according to claim 12, wherein the orbit comprises approximately a 24 hour period orbit with an inclination in the range of approximately 53 to 57 degrees, an eccentricity of approximately 0.32, an argument of perigee of approximately 270 degrees, and an ascending node longitude of approximately 43 degrees East.

22. The method according to claim 12, wherein the service arc is in the range of approximately plus and minus 5 hour period about the orbit apogee.

23. The method according to claim 12, wherein the payload element implements a digital audio system for Europe that includes a pan-European beam and a multiplicity of regional European spot beams.

24. The method according to claim 12, wherein orienting and correcting the spacecraft attitude comprises:

orientating the spacecraft to substantially align the payload element with a nominal target payload frame; and applying corrective attitude offsets from the nominal target payload frame to maintain the payload elements substantially pointing at the desired geographic region.

25. The method according to claim 12, wherein orienting the spacecraft comprises:

orienting the spacecraft such that the sun angles with respect to the spacecraft yaw-roll plane remain approximately within the range of about plus and minus 23.5 degrees at orbit apogee.

26. The method according to claim 12, wherein correcting the spacecraft attitude comprises:

calculating first beam center unit vectors based on a data for a spacecraft position in the vicinity of an orbit apogee in a nominal target payload reference frame, wherein each first beam center vector represents at least an approximation of a line-of-sight from the spacecraft to the center of a beam on the earth's surface;

calculating second beam center unit vectors in a nominal target payload frame based on data for a spacecraft position in the vicinity of the service arc;

calculating a matrix of beam center pointing errors based on a combination of the first and second beam center vectors;

calculating a composite matrix that includes skew-symmetric matrices of beam center unit vectors at a given position within the service arc;

calculating a vector of attitude corrections based on the matrix of beam center pointing errors and the composite matrix of beam center vector skew-symmetric matrices; and correcting the spacecraft attitude over at least a portion of the service arc by substantially aligning the spacecraft payload frame with a corrected target frame determined based on using the computed attitude corrections.

27. The method according to claim 26, wherein the combination includes the difference between the first and second beam center vectors.

28. The method according to claim 12, further comprising;

rotating the solar array about the rotation axis.

29. The method according to claim 12, wherein the spacecraft includes a payload that comprises at least one antenna operable to direct digital audio broadcasts toward a target region on the earth, the method further comprising:

directing digital audio broadcasts toward a target region on the earth.

30. The method according to claim 12, further comprising orienting the payload antenna so as to be directed towards one of a northern and a southern latitude coverage area when the spacecraft is in the vicinity of an orbit apogee.

31. The method according to claim 12, wherein the orbit inclination is between about 40 degrees and about 65 degrees.

32. The method according to claim 12, wherein the payload is rotated and fixed about a minus roll axis of the spacecraft, and wherein the step of correcting a spacecraft attitude comprises correcting the spacecraft attitude so that the spacecraft yaw rotation is approximately equal to minus the orbit inclination angle at the orbit ascending node and the spacecraft yaw rotation is approximately equal to the orbit inclination angle at the orbit descending node.

33. The spacecraft as recited in claim 13, wherein the payload antenna further comprises an earth sensor boresight.

34. The spacecraft as recited in claim 13, wherein the orbit inclination is between about 40 degrees and about 65 degrees.

35. The spacecraft as recited in claim 13, wherein the spacecraft adjusts its attitude during the service arc so that the spacecraft yaw rotation is approximately equal to minus the orbit inclination angle at the orbit ascending node and the spacecraft yaw rotation is approximately equal to the orbit inclination angle at the orbit descending node.

36. The spacecraft as recited in claim 13, wherein the orbit comprises approximately a 24 hour period orbit with an inclination in the range of approximately 53 to 57 degrees, an eccentricity of approximately 0.32, an argument of perigee of approximately 270 degrees, and an ascending node longitude of approximately 43 degrees East.

37. The spacecraft as recited in claim 13, wherein the service arc is in the range of approximately plus and minus 5 hour period about the orbit apogee.

38. The spacecraft as recited in claim 13, wherein the payload antenna implements a digital audio system for Europe that includes a pan-European beam and a multiplicity of regional European spot beams.

39. The spacecraft as recited in claim 13, wherein the spacecraft is oriented in its orbit such that the sun angles with respect to a spacecraft yaw-roll plane remain approximately within the range of about plus and minus 23.5 degrees at orbit apogee.

40. The spacecraft as recited in claim 13, wherein the spacecraft is configured to correct the spacecraft attitude by:

calculating first beam center unit vectors based on a data for a spacecraft position in the vicinity of an orbit apogee in a nominal target payload reference frame, wherein each first beam center vector represents at least an approximation of a line-of-sight from the spacecraft to the center of a beam on the earth's surface;

calculating second beam center unit vectors in a nominal target payload frame based on data for a spacecraft position in the vicinity of the service arc;

calculating a matrix of beam center pointing errors based on a combination of the first and second beam center vectors;

calculating a composite matrix that includes skew-symmetric matrices of beam center unit vectors at a given position within the service arc;

calculating a vector of attitude corrections based on the matrix of beam center pointing errors and the composite matrix of beam center vector skew-symmetric matrices; and correcting the spacecraft attitude over at least a portion of the service arc by substantially aligning the spacecraft payload frame with a corrected target frame determined based on using the computed attitude corrections.

41. The spacecraft as recited in claim 40, wherein the combination includes the difference between the first and second beam center vectors.

42. The spacecraft as recited in claim 13, wherein the payload antenna is operable to direct digital audio broadcasts toward a target region on the earth.

43. The spacecraft as recited in claim 13, wherein the payload antenna is oriented so as to be directed towards one of a northern and a southern latitude coverage area when the spacecraft is in the vicinity of orbit apogee.

44. A satellite constellation, comprising:

a plurality of satellites operable to transmit digital audio broadcasts, the satellites being arranged in orbits inclined in the range of about 40 degrees to about 65 degrees, the satellites operable for at least a portion of their orbits designated as service arcs, each of the satellites comprising:
at least one solar array rotatable about a single axis;
at least one thermal radiator;
at least one payload antenna rotated and fixed about a satellite coordinate frame, wherein the rotation angle of the payload antenna is substantially similar to an inclination of the orbit of the satellite so as to maintain a desired degree of a payload antenna pointing toward a desired region on the earth's surface; and attitude adjusters adapted to adjust the attitude of the satellite;

wherein the satellites are configured such that at orbit apogee each of the satellites have a nominal orientation in which the at least one solar array is substantially parallel to the earth pole axis, and the at least one thermal radiator is facing in a north-south direction; and wherein the attitude adjusters of each of the satellites are adapted to correct the satellite's attitude over at least a portion of the service arc with respect to the nominal orientation to maintain at least a portion of the desired degree of payload antenna pointing toward the desired region on the earth's surface.

45. A method for configuring and operating a spacecraft in an orbit that is inclined with respect to the earth's equatorial plane, wherein the spacecraft includes at least a solar array and radiator panels, and operates for at least a portion of the orbit designated as a service arc, the method comprising:

nominally orienting a yaw axis and a roll axis of the spacecraft such that the radiator panels are substantially parallel to the earth equatorial plane and a rotation axis of the solar array is substantially parallel to the earth pole axis;

configuring the spacecraft with a coordinate frame of a payload rotated and fixed about the roll axis of the spacecraft at an angle equivalent to about an orbit inclination of the spacecraft so as to maintain a desired degree of a payload pointing toward a desired region on the earth's surface; and correcting a spacecraft attitude over at least a portion of the service arc with respect to the nominal orientation to maintain at least a portion of the desired degree of payload pointing toward the desired region on the earth's surface, the step of correcting further comprising:

calculating first beam center unit vectors based on a data for a spacecraft position in the vicinity of an orbit apogee in a nominal target payload reference frame, wherein each first beam center vector represents at least an approximation of a line-of-sight from the spacecraft to the center of a beam on the earth's surface;

calculating second beam center unit vectors in a nominal target payload frame based on data for a spacecraft position in the vicinity of the service arc;

calculating a matrix of beam center pointing errors based on a combination of the first and second beam center vectors;

calculating a composite matrix that includes skew-symmetric matrices of beam center unit vectors at a given position within the service arc;

calculating a vector of attitude corrections based on the matrix of beam center pointing errors and the composite matrix of beam center vector skew-symmetric matrices; and correcting the spacecraft attitude over at least a portion of the service arc by substantially aligning the spacecraft payload frame with a corrected target frame determined based on using the computed attitude corrections.

* * * * *

UNITED STATES PATENT AND TRADEMARK OFFICE
CERTIFICATE OF CORRECTION

| | |
|---|---|
| PATENT NO. | : 6,616,104 B1 |
| APPLICATION NO. | : 10/177110 |
| DATED | : September 9, 2003 |
| INVENTOR(S) | : Gen-Sen James Cheng et al. |

It is certified that error appears in the above-identified patent and that said Letters Patent is hereby corrected as shown below:

IN THE SPECIFICATION

Column 5, Line 27: "$T_{ie}=T_{yaw}T_{oi}T_{ie}$" should read --$T_{te}=T_{yaw}T_{oi}T_{ie}$--.
Column 5, Line 29: "$T_{te}$" should read --$T_{ie}$--.

IN THE CLAIMS

Claim 8
Column 9, Line 66: "a" should be deleted.

Claim 13
Column 10, Line 64: "antennas" should read --antenna--.

Claim 26
Column 12, Line 1: "a" should be deleted.

Claim 30
Column 12, Line 36: "according to claim 12," should read "according to claim 26,--.

Claim 40
Column 13, Line 15: "a" should be deleted.

Claim 45
Column 14, Line 39: "a" should be deleted.

Signed and Sealed this

Twenty-ninth Day of August, 2006

JON W. DUDAS
*Director of the United States Patent and Trademark Office*